Dec. 10, 1929.                 H. A. SELAH                    1,738,969
                              CONDUIT FITTING
                           Filed April 28, 1926
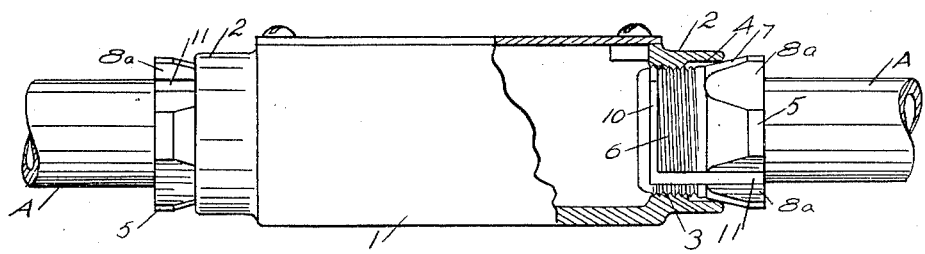
FIG. 1.
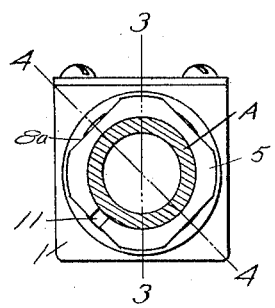
FIG. 2.
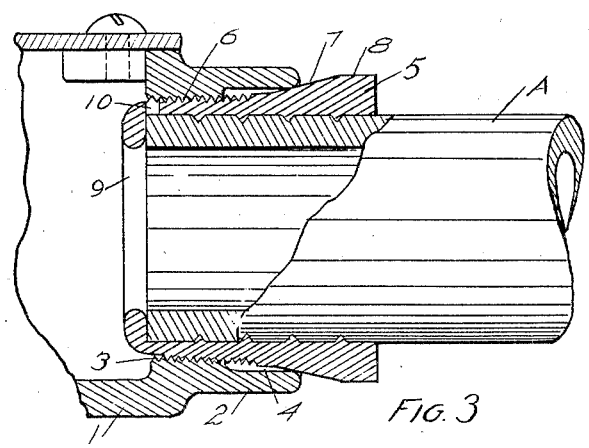
FIG. 3.
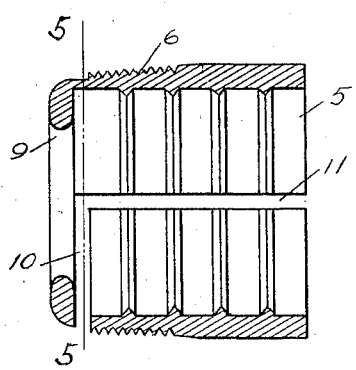
FIG. 4.
FIG. 5
Howard A. Selah
INVENTOR.
BY 
ATTORNEYS.

Patented Dec. 10, 1929

1,738,969

UNITED STATES PATENT OFFICE

HOWARD A. SELAH, OF ERIE, PENNSYLVANIA, ASSIGNOR TO ERIE MALLEABLE IRON COMPANY, OF ERIE, PENNSYLVANIA, A CORPORATION OF PENNSYLVANIA

CONDUIT FITTING

Application filed April 28, 1926. Serial No. 105,150.

The invention is directed to improvements in conduit fittings designed for use with threadless conduits. It is desirable where the conduit is placed in such a fitting that the conductor led from the conduit may be drawn over a continuous leading in surface so that there may be no tendency to abraid or injure the insulation on the conductor. It is also desirable with such structures to provide a guard, or stop, for the end of the conduit. This has been accomplished with conduits of this type using contractible sleeves arranged with their larger end away from the conduit. The present invention accomplishes this with a sleeve having its smaller end extending away from the conduit and this simplifies the construction and in some respects is more desirable. Features and details of the invention will appear from the specification and claims.

The invention is illustrated in the accompanying drawings as follows:—

Fig. 1 shows a side elevation, partly in section, of a conduit box in connection with which the invention is exemplified.

Fig. 2 is an end view of the fitting.

Fig. 3 is an enlarged section similar to the section shown in Fig. 1.

Fig. 4 is a section of the contractible sleeve.

Fig. 5 is a section on the line 5—5 in Fig. 4.

1 marks the body of the fitting, which, as before stated is exemplified as a box but the invention is not limited to such a body. A conduit-receiving extension 2 projects from the body. This has a screw-threaded inner end 3 and an enlarged outer end 4.

A contractible sleeve 5 is arranged in the extension. It has the screw-threaded inner, or smaller end 6, the tapered or wedge surfaced portion 7 intermediate its ends, and a wrench hold 8 having flats 8ª at the outer end.

The sleeve has an inwardly extending guard shoulder 9. This forms a continuous annular leading in surface. A circumferential slot 10 is arranged immediately to the rear of the guard shoulder and an axially extending slot 11 extends from the circumferential slot through the opposite end of the sleeve.

The conduit A being inserted into the sleeve, the sleeve may be drawn into the extension through the action of the screw thrust and the movement as it is drawn in the tapered surfaces 7 wedging on the inner wall of the extension contracts the sleeve into clamping engagement with the conduit. The wrench hold 8 at the outer end readily permits of the operation of the sleeve in a convenient manner and the intermediate compression of the sleeve provides a balanced clamping pressure throughout the length of the sleeve, thus assuring a full and complete engagement with the conduit.

The continuous leading in surface at the inner end prevents the abrasion of the conductor as it is led in over said surface and where this surface is in the form of a guard shoulder the guard shoulder covers and protects the conductor against the end edge of the pipe and at the same time forms the stop for the conduit.

What I claim as new is:—

1. In a conduit fitting, the combination of a body having an opening therein; a contractible sleeve having an axial slot and an exterior wedging surface engaging the walls of the opening, said sleeve having an internal shoulder on which is formed a continuous annular interior leading-in surface at its smaller end; and means forcing the sleeve into the opening to contract the same.

2. In a conduit fitting, the combination of a body having an opening therein; a contractible sleeve having an outer wedging surface engaging the walls of the opening, said sleeve having a continuous annular interior leading in surface at its smaller end and a circumferential slot adjacent to said surface with an axial slot extending from the circumferential slot; and means forcing the sleeve into the opening to contract the same.

3. In a conduit fitting, the combination of a body having an opening therein; a contractible sleeve having an exterior wedging surface engaging the walls of the opening, said sleeve having an internal guard shoulder at its smaller end and a circumferential slot adjacent to said surface with an axial slot extending from the circumferential slot; and means for forcing the sleeve into the opening to contract the same.

4. In a conduit fitting, the combination of a body having an opening therein having a portion of its length threaded and a portion unthreaded; a contractible sleeve in the opening having an axial slot and a portion screw threaded to engage the threads of the body and a portion unthreaded and tapered engaging the unthreaded surface of the wall of the opening, said tapered surface of the sleeve wedging in the opening to contract the sleeve into clamping engagement with the conduit, said sleeve having a wrench hold extension projecting from the body with the sleeve in place and a continuous annular interior leading in surface at its smaller end.

5. In a conduit fitting, the combination of a body having an opening therein having a portion of its length threaded and a portion unthreaded; a slotted contractible sleeve in the opening having a portion screw threaded to engage the threads of the body and a portion unthreaded and tapered engaging the unthreaded surface of the wall of the opening, said tapered surface of the sleeve wedging in the opening to contract the sleeve into clamping engagement with the conduit, said sleeve having a wrench hold extension projecting from the body with the sleeve in place, a continuous annular interior leading in surface at its smaller end, a circumferential slot adjacent to said leading in surface, and an axial slot extending from the circumferential slot.

6. In a conduit fitting, the combination of a body having an opening therein having a portion of its length threaded and a portion unthreaded; a contractible sleeve in the opening having an axial slot and a portion screw threaded to engage the threads of the body and a portion unthreaded and tapered engaging the unthreaded surface of the wall of the opening, said tapered surface of the sleeve wedging in the opening to contract the sleeve into clamping engagement with the conduit, said sleeve having a wrench-hold extension projecting from the body with the sleeve in place and having an internal guard shoulder at its smaller end.

7. In a conduit fitting, the combination of a body having an opening therein having a portion of its length threaded and a portion unthreaded; a slotted contractible sleeve in the opening having a portion screw threaded to engage the threads of the body and a portion unthreaded and tapered engaging the unthreaded surface of the wall of the opening, said tapered surface of the sleeve wedging in the opening to contract the sleeve into clamping engagement with the conduit, said sleeve having a wrench hold extension projecting from the body with the sleeve in place and having an internal guard shoulder at its smaller end and a circumferential slot adjacent to said guard shoulder and an axial slot extending from the circumferential slot.

8. In a conduit fitting, the combination of a body having an opening therein, the inner portion of the opening being threaded and the outer portion unthreaded and larger than the threaded portion; and a sleeve in the opening having an axial slot and its inner end threaded to engage the threads of the opening and an intermediate portion unthreaded and tapered engaging the unthreaded portion of the wall of the opening and wedged in the opening to contract the sleeve into clamping engagement with a conduit, said sleeve having a wrench-hold extension projecting from the body with the sleeve in place and a continuous annular interior leading in surface at its smaller end.

9. In a conduit fitting, the combination of a body having an opening therein, the inner portion of the opening being threaded and the outer portion unthreaded and larger than the threaded portion; and a slotted sleeve in the opening having its inner end threaded to engage the threads of the opening and an intermediate portion unthreaded and tapered engaging the unthreaded portion of the wall of the opening and wedged in the opening to contract the sleeve into clamping engagement with a conduit, said sleeve having a wrench-hold extension projecting from the body with the sleeve in place, a continuous annular interior leading in surface at its smaller end, a circumferential slot adjacent to said surface and an axial slot extending from the circumferential slot.

10. In a conduit fitting, the combination of a body having an opening therein, the inner portion of the opening being threaded and the outer portion unthreaded and larger than the threaded portion; and a sleeve in the opening having an axial slot and its inner end threaded to engage the threads of the opening and an intermediate portion unthreaded and tapered engaging the unthreaded portion of the wall of the opening and wedged in the opening to contract the sleeve into clamping engagement with a conduit, said sleeve having a wrench-hold extension projecting from the body with the sleeve in place and an internal guard shoulder at its smaller end.

11. In a conduit fitting, the combination of a body having an opening therein, the inner portion of the opening being threaded and the outer portion unthreaded and larger than the threaded portion; and a slotted sleeve in the opening having its inner end threaded to engage the threads of the opening and an intermediate portion unthreaded and tapered engaging the unthreaded portion of the wall of the opening and wedged in the opening to contract the sleeve into clamping engagement with a conduit, said sleeve having a wrench-hold extension projecting from the body with the sleeve in place, an internal guard shoulder at its smaller end and a circumferential slot adjacent to said surface and having an axial slot extending from the circumferential slot.

In testimony whereof I have hereunto set my hand.

HOWARD A. SELAH.